United States Patent
Franco et al.

(10) Patent No.: US 12,318,859 B2
(45) Date of Patent: Jun. 3, 2025

(54) METHOD FOR MECHANICALLY MOUNTING AND PROTECTING EXTENDED LENGTH OPTICAL FIBER

(71) Applicant: Baker Hughes Oilfield Operations LLC, Houston, TX (US)

(72) Inventors: Juan Franco, Blacksburg, VA (US);
Paul Wysocki, Blacksburg, VA (US);
Navin Sakthivel, Spring, TX (US);
Aaron Avagliano, Tomball, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 163 days.

(21) Appl. No.: 17/724,354

(22) Filed: Apr. 19, 2022

(65) Prior Publication Data
US 2023/0333323 A1    Oct. 19, 2023

(51) Int. Cl.
*B23K 20/10*    (2006.01)
*G02B 6/36*    (2006.01)

(52) U.S. Cl.
CPC ............ *B23K 20/10* (2013.01); *G02B 6/3636* (2013.01)

(58) Field of Classification Search
CPC ............... G02B 6/3636; G02B 6/3652; G02B 6/46–486; G02B 6/3608; G02B 6/3612; G02B 6/3628; G02B 6/4243; G02B 6/50–545; Y10T 156/1795; Y10T 156/1788; B65H 35/00–10; B29C 65/083; B29C 65/085; B29C 65/086; B29C 65/08–087; B23K 20/10; B23K 20/103; B23K 20/106; B23K 5/20; B23K 1/06; B23K 37/02; E21B 47/135; E21B 17/026; E21B 17/023; B32B 2310/028

USPC .... 156/71, 73.1, 293, 577, 574, 73.2, 580.1, 156/580.2; 228/110.1, 1.1
See application file for complete search history.

(56) References Cited

U.S. PATENT DOCUMENTS

| | | | |
|---|---|---|---|
| 4,328,061 A * | 5/1982 | Off | B29C 66/8242 156/522 |
| 5,364,489 A | 11/1994 | Bailey et al. | |
| 5,611,017 A | 3/1997 | Lee et al. | |
| 2002/0181880 A1 * | 12/2002 | Dautartas | G02B 6/3652 385/137 |
| 2005/0018974 A1 | 1/2005 | Rolston et al. | |
| 2009/0130342 A1 * | 5/2009 | Endo | B29C 65/5092 156/182 |
| 2013/0098557 A1 * | 4/2013 | Takeuchi | B65H 35/004 156/349 |

(Continued)

OTHER PUBLICATIONS

International Search Report & Written Opinion, Mailed: Aug. 11, 2023, Application No. PCT/US2023019102, filed Apr. 19, 2023, 9 pages.

*Primary Examiner* — John L Goff, II
(74) *Attorney, Agent, or Firm* — Baker Hughes Patent Organization

(57) ABSTRACT

An apparatus and method of embedding an optical fiber within a substrate. The apparatus includes a bonding device and a conveyance device. The bonding device bonds a foil layer to the substrate to seal the optical fiber within a groove of the substrate. The conveyance device moves the substrate and the bonding device relative to each other. Relative motion between the substrate and the bonding device draws the optical fiber into the groove and the foil layer over the optical fiber at a collection point.

3 Claims, 4 Drawing Sheets

(56) References Cited

U.S. PATENT DOCUMENTS

| | | |
|---|---|---|
| 2019/0377148 A1 | 12/2019 | Bookbinder et al. |
| 2021/0157083 A1 | 5/2021 | Burns et al. |

\* cited by examiner

METHOD FOR MECHANICALLY MOUNTING AND PROTECTING EXTENDED LENGTH OPTICAL FIBER

BACKGROUND

In the resource recovery industry, a sensor can be disposed in a member, such as a pipeline, generator, facility, etc. for various purposes. For example, optical well monitoring includes sending an optical signal through an optical fiber disposed along a tubular extending into a borehole. The optical fiber can deteriorate in the presence of a downhole environment or be mechanically damaged if not protected during deployment or use. Therefore, it is desirable to be able to protect the optical fiber while it is disposed in a borehole or other difficult environment.

SUMMARY

In one aspect, a method of embedding an optical fiber within a substrate is disclosed herein. The substrate and a bonding device are moved relative to each other to draw the optical fiber into a groove of the substrate and a foil layer over the optical fiber at a collection point. The foil layer is bonded to the substrate using the bonding device to seal the optical fiber within the groove.

In another aspect, an apparatus for embedding an optical fiber within a substrate is disclosed herein. The apparatus includes a bonding device for bonding a foil layer to the substrate to seal the optical fiber within a groove of the substrate and a conveyance device for moving the substrate and the bonding device relative to each other, wherein relative motion between the substrate and the bonding device draws the optical fiber into the groove and the foil layer over the optical fiber at a collection point.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
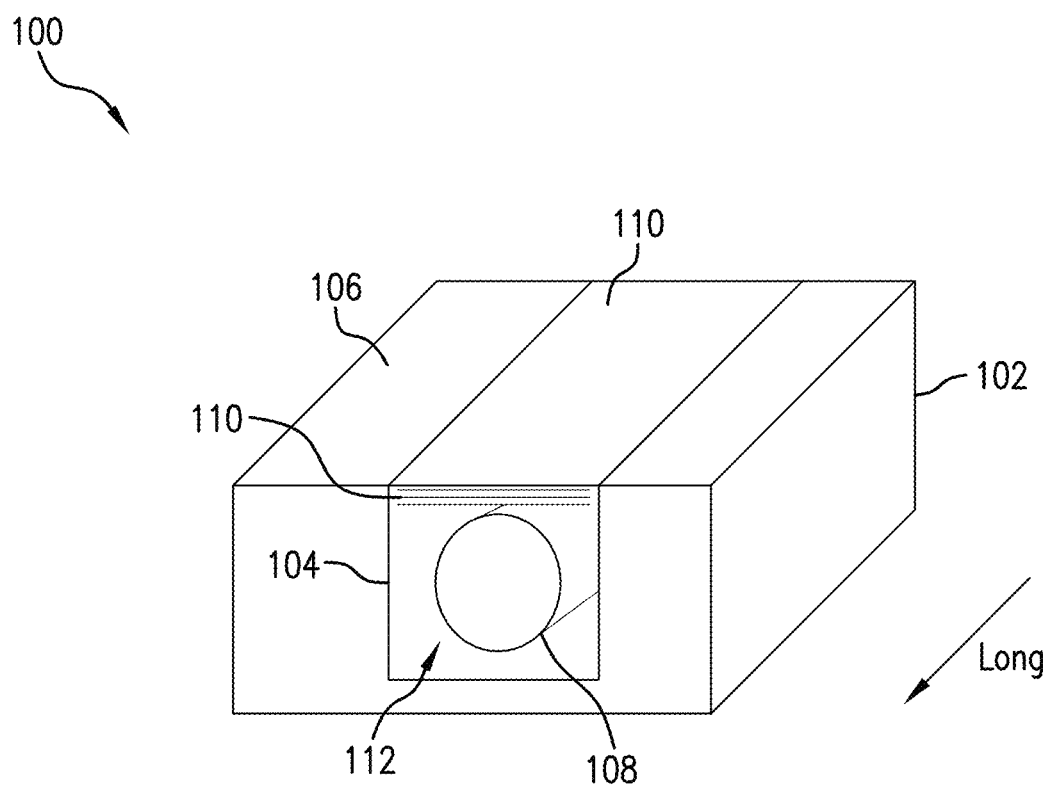
FIG. 1 shows a member that can be created using the methods disclosed herein.

Referring to FIG. 1, a member 100 is shown that can be created using the methods disclosed herein. The member 100 includes a substrate 102 with a groove 104 formed in a surface 106 of the substrate 102. The substrate 102 can be a pipe that is used for petroleum exploration, such as a tubular of a drilling system, completion system, production system, a fluid sequestration system, a $CO_2$ sequestration system, a hydrogen sequestration system, refinery fractional distillation columns, boiler structures, pipelines, storage tanks, industrial pump casings, wind turbine systems, structures in oil tankers, flanges, reducers, heat exchangers, diffusers for asset management, etc. The substrate 102 can also be used in condition monitoring and preventive maintenance in valves.

In other embodiments the substrate 102 can also be a strip of material that can be subsequently applied to an article of such a system using various bonding methods. An optical fiber 108 is disposed within the groove 104 and a foil layer 110 is formed over the groove 104 to create a chamber 112 that houses the optical fiber 108. The foil layer 110 is formed by placing one or more foils into the groove 104 or over the groove 104 and transmitting ultrasonic waves at the one or more foils to cause the one or more foils to bond to each other and to the substrate 102. A foils is a long, thin strip of material. In one embodiment, the foil is a metal foil. In other embodiments, the foil is a plastic foils or a ceramic foil.

Figure 2:
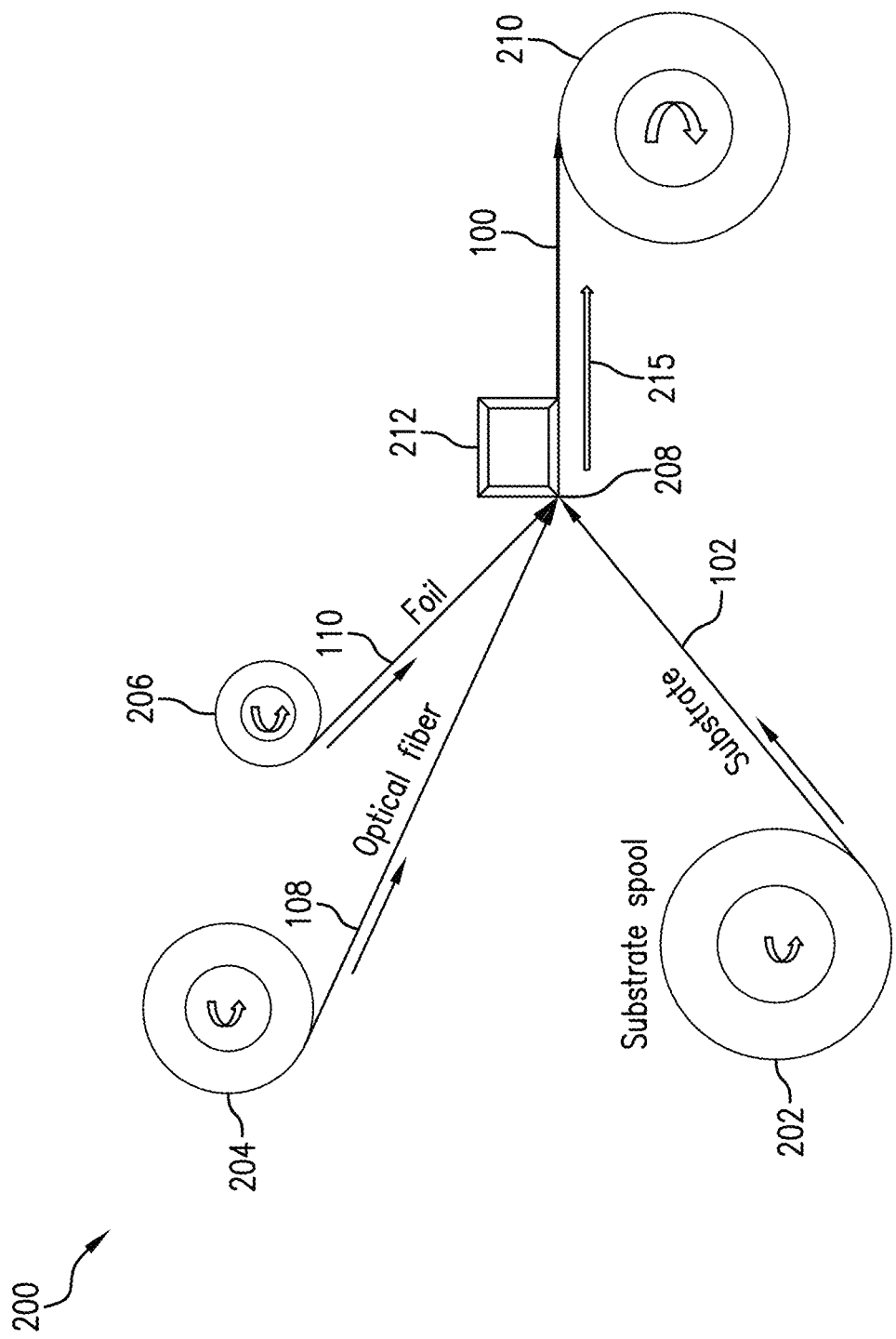
FIG. 2 shows an apparatus suitable for manufacturing the member of FIG. 1.

FIG. 2 shows an apparatus 200 suitable for manufacturing the member 100 of FIG. 1, in an illustrative embodiment. The apparatus 200 includes a first spool 202, a second spool 204 and a third spool 206. The substrate is a metal strip wound on the first spool 202, the optical fiber 108 is on the second spool 204, and a strip of foil that makes the foil layer 110 is would around the third spool 206. To manufacture the member, 100, the substrate 102, optical fiber 108 and foil layer 110 are unwound from the first spool 202, second spool 204 and third spool 206, respectively, to meet and combine at a collection point 208. At the collection point 208, the optical fiber 108 is fit into the groove 104 and the foil layer 110 is placed over the groove 104 using a roller or guiding surface. The member 100 is then rolled along direction 215 onto a fourth spool 210 or a pickup spool. The fourth spool 210 can thus be a conveyance device for the member 100 or a part of a conveyance device. A bonding device 212 resides between the collection point 208 and the fourth spool 210. In various embodiments, the bonding device 212 is a sonification device that bonds metals using acoustic waves, such as ultrasonic waves. As the member 100 is rolled past the bonding device 212 by rotation of the fourth spool 210, the bonding device 212 bonds the foil layer 110 to the substrate 102 to enclose the optical fiber 108 within the groove 104. Once the final assembly or member 100 is on the fourth spool 210, the member 100 can be unrolled from the fourth spool 210 so that it can be attached to or adhered to an article, such as a pipe or tubular used in downhole applications, such as fluid sequestration, $CO_2$ sequestration, hydrogen sequestration, etc.

Figure 3:
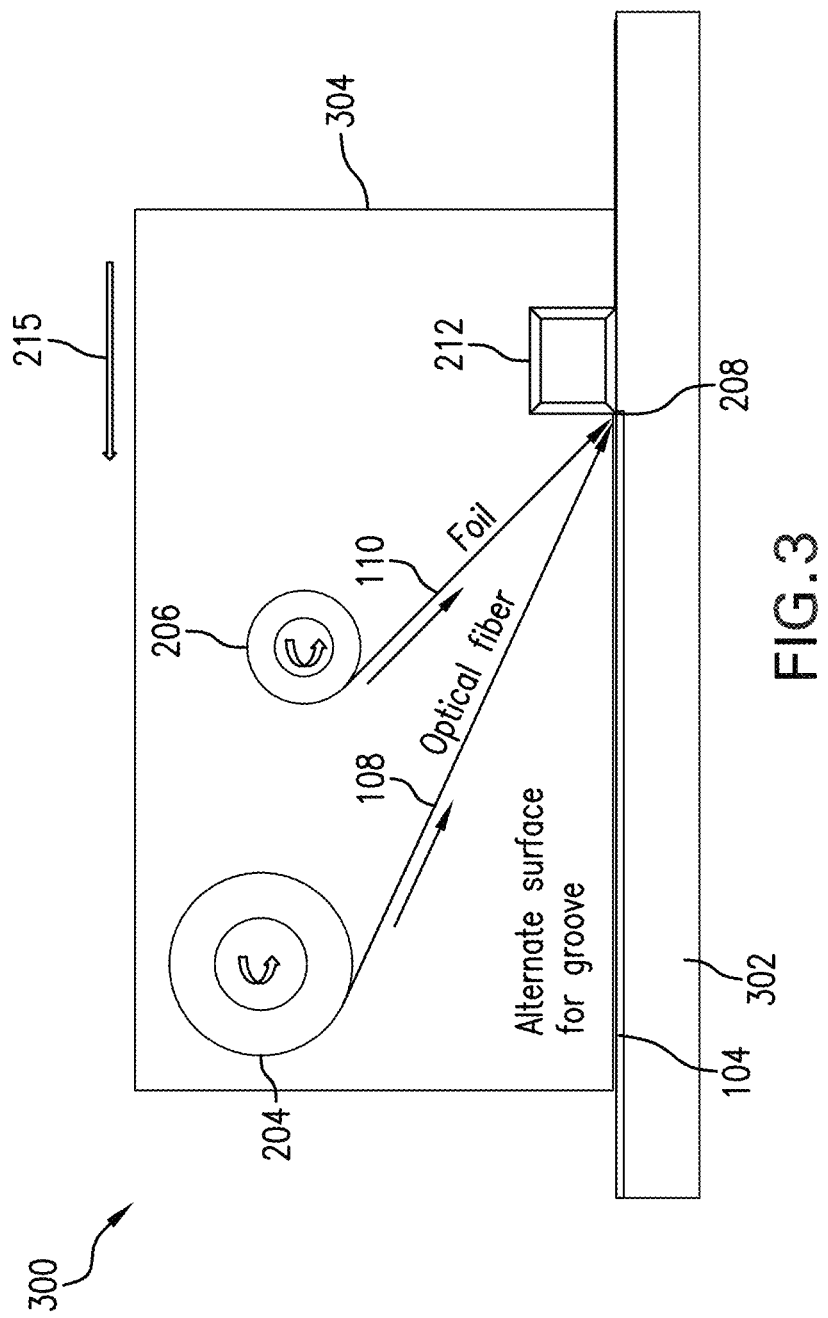
FIG. 3 shows an apparatus for manufacturing the member, in another embodiment.

FIG. 3 shows an apparatus 300 for manufacturing the member 100, in another embodiment. The member 100 can be a part 302 that is too large or unwieldy for storage on a spool. In various embodiment, the member 100 can be an article used for petroleum exploration, such as a containment vessel, pipe or tubular of a drilling system, completion system, production system, etc. The part 302 can either be moved relative to the second spool 204, third spool 206, and bonding device 212 or the part 302 can be held stationary while the second spool 204, third spool 206 and bonding device 212 can be moved relative to the part 302. The part 302 includes a groove 104 formed in its surface. As the second spool 204, third spool 206, and bonding device 212 are moved along the groove 104, the optical fiber 108 and foil layer 110 are placed onto the part 302 are the groove 104 and the bonding device 212 then moves over the foil layer 110 to bond it to the part 302. The second spool 204, third spool 206, and bonding device 212 can be including in a housing or a conveyance device 304 for uniform movement along the substrate 102.

While FIG. 3 shows an apparatus 300 with respect to a flat surface of the member 100, it is to be understood that the member can have a curved surface and the apparatus 300 can be used to at the curved surface. For example, the apparatus 300 can be used to mount the optical fiber on either an inside surface of a tubular or an outside surface of a tubular.

Figure 4:
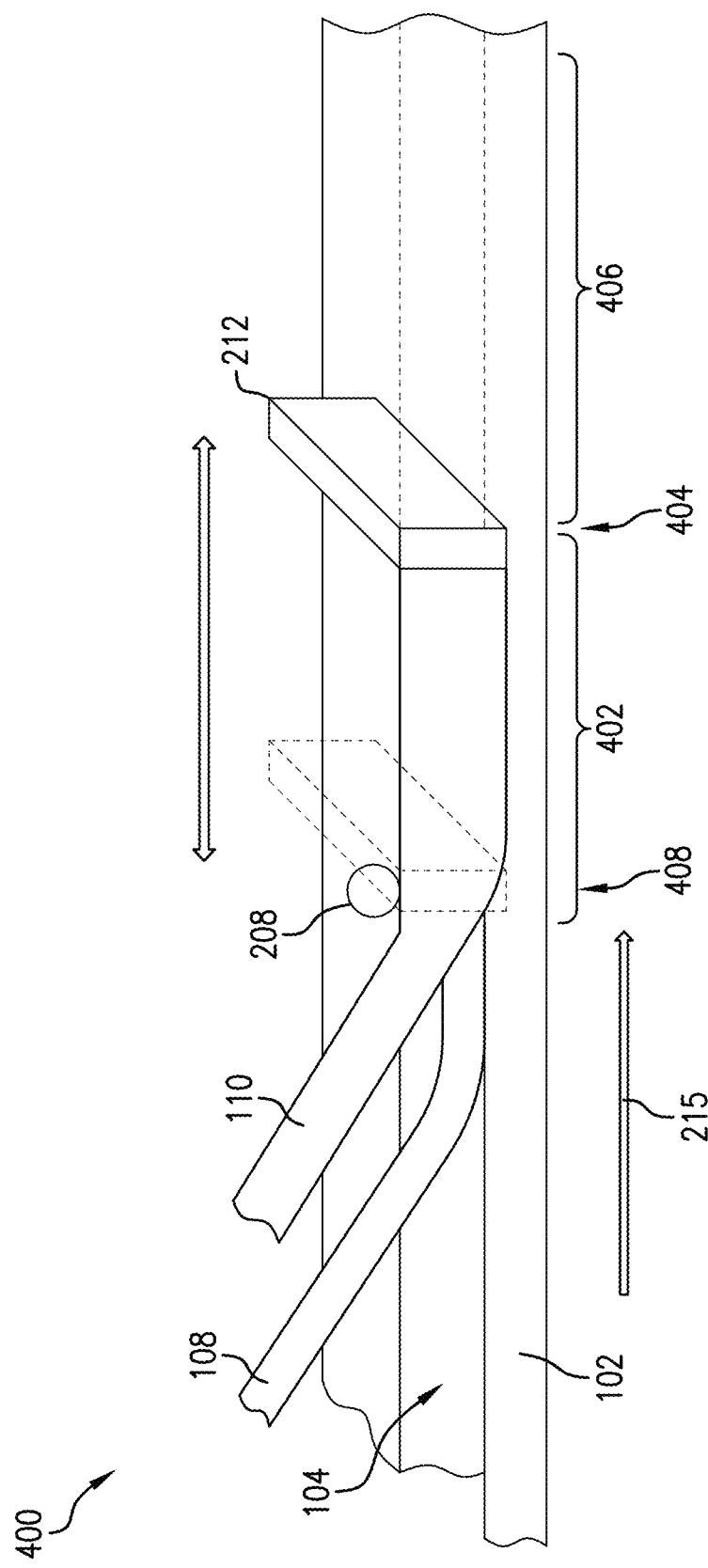
FIG. 4 shows a close-up view of a section of apparatus for illustrating purposes.

FIG. 4 shows a close-up view of a section 400 of apparatus 300 for illustrating purposes. The section 400 shows the collection point 208 and the bonding device 212. The substrate 102 is moved along direction 215 to draw the optical fiber 108 into the groove 104 and the foil layer 110 onto the substrate 102. The substrate 102 continues to move along direction 215 to form an unbonded section 402 that is drawn toward the bonding device 212, which is residing at a first bonder location.

The bonding device 212 can bond the foil layer 110 to the substrate 102 in a step-like process. Once the end of the unbonded section 402 reaches the first device location 404, the motion of the substrate 102 is halted. The bonding device 212 then slides from the first device location 404 to a second device location 408 at the collection point 208, bonding the foil layer 110 to the substrate 102 as it moves. Once the bonding device 212 reaches the second device location 408 it reverses course to return to the first device location 404. After the bonding device 212 returns to the first device location 404, the motion of the substrate 102 is restarted to move the newly bonded member into a bonded section 406 and to form a new unbonded section 402.

In another embodiment, the bonding device 212 is held stationary a location with respect to the collection point 208. The substrate 102 and the bonding device 212 move relative to each other at a slow enough pace that a time that it takes to bond a section of the substrate 102 is less than a time that it takes for the section to pass the bonding device.

Set forth below are some embodiments of the foregoing disclosure:

Embodiment 1. A method of embedding an optical fiber within a substrate. The substrate and a bonding device are moved relative to each other to draw the optical fiber into a groove of the substrate and a foil layer over die optical fiber at a collection point. The foil layer is bonded to the substrate using the bonding device to seal the optical fiber within the groove.

Embodiment 2. The method of any prior embodiment, wherein the bonding device is held stationary between a first spool and a pickup spool, further comprising rolling the substrate from the first spool, past the bonding device and onto the pickup spool.

Embodiment 3. The method of any prior embodiment, further comprising rolling the optical fiber from a second spool and the foil layer from a third spool, wherein the optical fiber is fit into the groove at the collection point and the foil layer is placed over the optical fiber at the collection point.

Embodiment 4. The method of any prior embodiment, further comprising subsequently unrolling the substrate from the pickup spool and adhering the substrate to an article for use downhole.

Embodiment 5. The method of any prior embodiment, wherein the bonding device is slidable between a first device location and a second device location, further comprising moving the substrate to form an unbonded length between the first device location and the second device location, stopping a motion of the substrate, moving the bonding device from the first device location to the second device location to bond the foil layer to the substrate, and moving the bonding device back to the first device location.

Embodiment 6. The method of any prior embodiment, wherein the substrate is one of: (i) a metal strip; (ii) a tubular; (iii) a pipe; (iv) a containment vessel; (v) a member used in fluid sequestration; (vi) a member used in $CO_2$ sequestration; and (vii) a member used in hydrogen sequestration.

Embodiment 7. The method of any prior embodiment, further comprising holding the substrate stationary and moving the bonding device relative the substrate.

Embodiment 8. The method of any prior embodiment, further comprising moving a second spool including the optical fiber and a third spool including the foil layer relative to the substrate along with the bonding device.

Embodiment 9. The method of any prior embodiment, wherein bonding the foil layer to the substrate further comprising using ultrasonic bonding.

Embodiment 10. An apparatus for embedding an optical fiber within a substrate includes a bonding device for bonding a foil layer to the substrate to seal the optical fiber within a groove of the substrate and a conveyance device for moving the substrate and the bonding device relative to each other, wherein relative motion between the substrate and the bonding device draws the optical fiber into the groove and the foil layer over the optical fiber at a collection point.

Embodiment 11, The apparatus of any prior embodiment, wherein the conveyance device includes a pickup spool and the bonding device is held stationary between a first spool holding the substrate and the pickup spool, whereas rotating the pickup spool moves the from the first spool past the bonding device.

Embodiment 12. The apparatus of any prior embodiment, further comprising a second spool including the optical fiber and a third spool including the foil layer, wherein rotating the pickup spool unrolls the optical fiber from the second spool to fit into the groove at the collection point and unrolls the foil layer from the third spool to be placed over the optical fiber at the collection point.

Embodiment 13. The apparatus of any prior embodiment, wherein the bonding device is slidable between a first device location and a second device location, wherein the pickup spool is rotated to form an unbonded length between the first device location and the second device location, rotation of the pickup spool is stopped, the bonding device is moved from the first device location to the second device location to bond the foil layer to the substrate, and the bonding device is moved back to the first device location.

Embodiment 14. The apparatus of any prior embodiment, wherein the substrate is one of: (i) a metal strip; (ii) a tubular; (iii) a pipe; (iv) a containment vessel; (v) a member used in fluid sequestration; (vi) a member used in CO2 sequestration; and (vii) a member used in hydrogen sequestration.

Embodiment 15. The apparatus of any prior embodiment, wherein the substrate is stationary and the bonding device is in motion relative to the substrate.

Embodiment 16. The apparatus of any prior embodiment, wherein the conveyance device includes a second spool, a third spool and the bonding device and moves relative to the substrate.

Embodiment 17. The apparatus of any embodiment, wherein the bonding device is an ultrasonic bonding device.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An apparatus for embedding an optical fiber in a groove formed within a substrate, comprising:
    a housing configured to move with respect to the substrate along a direction of the groove;
    a fiber spool in the housing, the fiber spool having an optical fiber wound thereon;
    a foil spool in the housing, the foil spool having metal foil wound thereon; and
    an ultrasonic bonding device in the housing that generates ultrasonic waves for bonding metal,
    wherein movement of the housing with respect to the substrate draws the optical fiber into the groove and the metal foil over the optical fiber at a collection point to form a chamber that houses the optical fiber and subsequently moves the ultrasonic bonding device over the metal foil to bond the metal foil to the substrate.

2. The apparatus of claim 1, wherein the substrate is one of: (i) a metal strip; (ii) a tubular; (iii) a pipe; (iv) a containment vessel; (v) a member used in fluid sequestration; (vi) a member used in $CO_2$ sequestration; and (vii) a member used in hydrogen sequestration.

3. The apparatus of claim 1, wherein the substrate is stationary and the ultrasonic bonding device is in motion relative to the substrate.

* * * * *